(12) United States Patent
Matsumoto et al.

(10) Patent No.: US 8,343,688 B2
(45) Date of Patent: Jan. 1, 2013

(54) POLYMER ELECTROLYTE FUEL CELL HAVING A FASTENING STRUCTURE INCLUDING ELASTIC MEMBERS

(75) Inventors: Toshihiro Matsumoto, Osaka (JP); Hiroki Kusakabe, Osaka (JP); Mitsuo Yoshimura, Kyoto (JP); Yoko Yamaguchi, Osaka (JP); Yoshiki Nagao, Osaka (JP)

(73) Assignee: Panasonic Corporation, Osaka (JP)

( * ) Notice: Subject to any disclaimer, the term of this patent is extended or adjusted under 35 U.S.C. 154(b) by 103 days.

(21) Appl. No.: 12/306,977

(22) PCT Filed: Jun. 5, 2008

(86) PCT No.: PCT/JP2008/001428
§ 371 (c)(1),
(2), (4) Date: Dec. 30, 2008

(87) PCT Pub. No.: WO2008/149554
PCT Pub. Date: Dec. 11, 2008

(65) Prior Publication Data
US 2009/0305104 A1 Dec. 10, 2009

(30) Foreign Application Priority Data

Jun. 6, 2007 (JP) ................................. 2007-150309

(51) Int. Cl.
*H01M 2/08* (2006.01)
*H01M 2/14* (2006.01)
*H01M 4/64* (2006.01)
(52) U.S. Cl. .................. 429/511; 429/517; 429/518
(58) Field of Classification Search ................ 429/12–46
See application file for complete search history.

(56) References Cited

U.S. PATENT DOCUMENTS 4,973,531 A   11/1990   Zaima et al.
(Continued)

FOREIGN PATENT DOCUMENTS

DE   199 48 086   9/2000
(Continued)

OTHER PUBLICATIONS

International Preliminary Report on Patentability and Written Opinion of the International Searching Authority, issued Dec. 7, 2009 in International Application PCT/JP2008/001428 (with English translation).

(Continued)

*Primary Examiner* — Barbara Gilliam
*Assistant Examiner* — Steven Scully
(74) *Attorney, Agent, or Firm* — Wenderoth, Lind & Ponack, L.L.P.

(57) ABSTRACT

A polymer electrolyte fuel cell is provided with a fuel cell stack assembled by sandwiching a plurality of stacked single cell modules with a plurality of fastening members through a pair of end plates. The fuel cell includes a first elastic member arranged between the fastening member and the end plate and a plurality of second elastic members arranged between the end plate and the end of the fuel cell stack. Each of the second elastic members is arranged on the surface of the end plate corresponding to the electrode portion of a membrane electrode assembly in each of the single cell module, and each of the first elastic members is arranged on the surface of the end plate corresponding to a seal member arrangement region in which the seal member is arranged between the periphery of the membrane electrode assembly and a pair of separator plates in each single cell module.

17 Claims, 10 Drawing Sheets

U.S. PATENT DOCUMENTS

| | | | |
|---|---|---|---|
| 4,997,728 | A | 3/1991 | Onoda et al. |
| 6,258,475 | B1 | 7/2001 | Sugita et al. |
| 6,270,917 | B1 | 8/2001 | Maeda et al. |
| 2003/0027031 | A1 | 2/2003 | Baldauf et al. |
| 2003/0152819 | A1* | 8/2003 | Hatoh et al. .................. 429/32 |
| 2004/0121216 | A1* | 6/2004 | Blanchet ..................... 429/37 |
| 2005/0277012 | A1 | 12/2005 | Inagaki |
| 2007/0042250 | A1 | 2/2007 | Inagaki |
| 2007/0248855 | A1 | 10/2007 | Reinert |

FOREIGN PATENT DOCUMENTS

| | | |
|---|---|---|
| DE | 698 12 695 | 1/2004 |
| EP | 0620609 A1 | 10/1994 |
| EP | 1 465 272 | 10/2004 |
| JP | 61-248368 | 11/1986 |
| JP | 62-271364 | 11/1987 |
| JP | 9-259916 | 10/1997 |
| JP | 9-270267 | 10/1997 |
| JP | 2004-362940 | 12/2004 |
| JP | 2006-179402 | 7/2006 |
| JP | 2007-42471 | 2/2007 |
| JP | 2007-113707 * | 5/2007 |
| JP | 2007-242260 | 9/2007 |
| KR | 2007-0040409 | 4/2007 |
| WO | 99/27602 | 6/1999 |
| WO | 01/48845 | 7/2001 |
| WO | 2006/012844 | 2/2006 |

OTHER PUBLICATIONS

International Search Report issued Aug. 19, 2008 in the International (PCT) Application of which the present application is the U.S. National Stage.

* cited by examiner

POLYMER ELECTROLYTE FUEL CELL HAVING A FASTENING STRUCTURE INCLUDING ELASTIC MEMBERS

TECHNICAL FIELD

The present invention relates to a fuel cell used for a portable power source, a power source for electric cars, a household cogeneration system and the like, and particularly, to a polymer electrolyte fuel cell using a polymer electrolyte.

BACKGROUND ART

A fuel cell using a polymer electrolyte generates power and heat at the same time by electrochemically reacting a fuel gas containing hydrogen with an oxidizer gas containing oxygen such as air. This fuel cell is basically constituted of a polymer electrolyte membrane which selectively transfers hydrogen ions and a pair of electrodes, that is an anode and a cathode, formed on both surfaces of the polymer electrolyte membrane. These electrodes are respectively provided with a catalyst layer which contains, as its major component, a carbon powder carrying a platinum group metal catalyst and is formed on the surface of a polymer electrolyte membrane and a gas diffusion layer which is arranged on the outside surface of the catalyst layer and has permeability and electron conductivity. A structure fabricated by assembling integrally a polymer electrolyte membrane with electrodes (including gas diffusion layers) in this manner is called an electrolyte membrane-electrode assembly (hereinafter referred to as "MEA").

Separator plates which sandwich and fix the MEA mechanically and at the same time electrically connect neighboring MEAs in series with each other are arranged on both sides of the MEA. Gas flow passages which supply such a fuel gas and oxidizer gas to each of the electrodes and convey the produced water and excess gas out of the reaction system are formed on the separator plates at positions where the separators are in contact with the MEA. Though such gas flow passages may be formed separately from the separator plate, generally a groove is formed on the surface of the separator plate to form a gas flow passage. Here, such a structure in which the MEA is sandwiched between a pair of separators is called a single cell module.

The supply of reaction gas to the gas flow passage formed between the separator plate and the MEA as well as the discharge of reaction gas and produced water from the gas flow passage are conducted by forming a through-hole called a manifold hole and by communicating the outlet and inlet of the gas flow passage with the manifold hole to distribute the reaction gas from the manifold hole to each gas flow passage.

Further, a gas seal member or a gasket is arranged as a seal member between the pair of separators in such a manner as to surround the part where the electrodes are formed in the MEA, that is, the outer periphery of a power generation region in order to prevent the fuel gas and the oxidizer gas supplied to the gas flow passage from leaking out of the system and to prevent the two types of gases from being mixed. These gaskets seal the periphery of the manifold hole.

A fuel cell generates heat during operation and it is therefore necessary to cool it by cooling water or the like to maintain the battery in a good-temperature condition. Generally, a fuel cell is provided with one cooling section which flows cooling water every one to three cells. These MEAs, separator plates and cooling sections are alternately stacked, and after 10 to 200 cells are stacked, the stacked cells are sandwiched between end plates by interposing a current collecting plate and an insulating plate and fixed from both ends with fastening rods (bolts) in the structure of a usual stacked cell (fuel cell stack).

In such a stacked cell, a fastening manner is adopted such that a plurality of single cell modules including a cooling section are stacked in one direction, a pair of end plates are arranged on both sides of the stacked body and fastening rods (bolts) are used to fix these end plates, thereby fastening each single cell module. As such a fastening manner, a structure is adopted in which a metal material such as stainless steel is generally used for the end plates and fastening rods from the viewpoint of mechanical strength, and these end plates and fastening rods are electrically insulated from the stacked cell by insulating plates to prevent current from leaking out of the system by interposing the end plates. As to the fastening rods, they are passed through through-holes formed in the edge of the separator plates and the whole stacked cell is fastened with a metal belt by interposing the end plates.

In the stacked cell for which such a fastening manner is adopted, it is regarded as important to fasten the single cell module with in-plane (in a plane perpendicular to the stacking direction) uniform fastening force. The reason is that this uniform fastening force makes it possible to prevent leakage of, for example, air, hydrogen and cooling water and also the breakdown of the single cell module, thereby ensuring that generation efficiency can be enhanced and the life of the battery can be prolonged. From the viewpoint of making the fastening force uniform in this fastening manner, for example, Patent Document 1 proposes a method in which a spring is sandwiched between the X-shape fastening plates and a spring arranged in the center is made to have larger spring force than springs arranged in the periphery to thereby make the fastening force uniform. Also, in Patent Document 2, a method is proposed in which the parts which apply pressure are made to be in point contact with the end plate to thereby make the fastening force uniform. Further, besides the above, for example, various proposals are made as disclosed in Patent Documents 3 to 10.

Patent Document 1: JP-A No. 62-271364
Patent Document 2: JP-A No. 9-259916
Patent Document 3: JP-A No. 2007-113707
Patent Document 4: JP-A No. 61-248368
Patent Document 5: JP-A No. 09-270267
Patent Document 6: U.S. Pat. No. 4,997,728
Patent Document 7: U.S. Pat. No. 6,258,475
Patent Document 8: USP No. 2005/0277012
Patent Document 9: U.S. Pat. No. 4,973,531
Patent Document 10: USP No. 2007/0042250

DISCLOSURE OF INVENTION

Problems to be Solved by the Invention

However, the MEA and the gasket arranged between the separator plates are generally different in rigidity from each other. Generally, the rigidity of the gasket is less than the rigidity of the MEA in the thickness direction. Therefore, when a load for fastening is applied at the end plate, the difference in rigidity causes the gasket to be deformed more largely than the MEA. The contact pressure between the MEA and the separator plate and the contact pressure between the gasket and the separator plate are uneven, which brings about a variation in contact resistance, causing a problem as to deterioration in the performance of power generation in a fuel cell. In order to suppress the deterioration in the power generation caused by uneven contact resistance, there is adopted the case where actions are taken to apply more load than is required. In such a case, a reduction in the mechanical strength of the MEA and gasket is accelerated, giving rise to the problem of a shorter life of a fuel cell. Even in the manners disclosed in Patent Documents 1 and 2, there is a variation in contact pressure between MEA and the separator plate, giving rise to a similar problem.

Accordingly, it is an object of the present invention to solve the above problem and to provide a polymer electrolyte fuel cell which has less variation in contact pressure between the membrane electrode assembly and the separator plate and uses a fastening structure for applying the proper fastening force to a seal member arranged between the separator plates, in the polymer electrolyte fuel cell.

Means for Solving the Subject

In order to achieve the above object, the present invention is constructed as follows.

According to a first aspect of the present invention, there is provided a polymer electrolyte fuel cell provided with a fuel cell stack assembled by stacking single cell modules each containing a membrane electrode assembly, a pair of separator plates sandwiching the membrane-electrode assembly and a seal member arranged between the periphery of the membrane-electrode assembly and the pair of separator plates, by arranging a pair of end plates on both ends of the stacked single cell modules, and by fastening the pair of end plates with a plurality of fastening members, the fuel cell comprising:

a first elastic member arranged between the each fastening member and the end plate; and a plurality of second elastic members arranged between the end plate and the end of the fuel cell stack, wherein each of the second elastic members is arranged on a second elastic member arrangement region on a surface of the end plate corresponding to an electrode portion of the membrane electrode assembly in each of the single cell modules.

According to a second aspect of the present invention, there is provided the polymer electrolyte fuel cell according to the first aspect, wherein the first elastic member is arranged on the surface of the end plate corresponding to a region where the seal member is arranged in each of the single cell modules.

According to a third aspect of the present invention, there is provided the polymer electrolyte fuel cell according to the second aspect, wherein a recessed portion is formed on an end side surface of the fuel cell stack of the end plate, an inside bottom surface of the recessed portion is used as the elastic member arrangement region and the plurality of second elastic members are arranged between the inside bottom surface and the end of the fuel cell stack, and periphery of the recessed portion on the surface of the end plate is in contact with the end of the fuel cell stack.

According to a fourth aspect of the present invention, there is provided the polymer electrolyte fuel cell according to the third aspect, wherein each of the separator plates and end plates has a square form, the first elastic member is arranged in the vicinity of each center of four sides of the square form on the end plate, and each of the second elastic members is arranged in an inside region of a region of a square form formed of lines connecting the four first elastic members in the second-elastic member arrangement region.

According to a fifth aspect of the present invention, there is provided the polymer electrolyte fuel cell according to the fourth aspect, wherein on a line connecting the center of the square form region formed by the lines connecting the four elastic members with the first elastic member, the second elastic member is arranged in the second elastic member arrangement region at a position closer to the center of the square form region than the center of the line.

According to a sixth aspect of the present invention, there is provided the polymer electrolyte fuel cell according to the third aspect, wherein each of the separator plates and end plates has a square form, the first elastic member is arranged on each of four corners of the square form on the end plate, and on a line connecting the center of a square form region formed by the lines connecting the four elastic members with the first elastic member, the second elastic member is arranged in the second-elastic member arrangement region at a position closer to the center of the square form region than the center of the line.

According to a seventh aspect of the present invention, there is provided the polymer electrolyte fuel cell according to the third aspect, wherein a current collecting plate is arranged between the second elastic member arrangement region and the end of the fuel cell stack.

According to an eighth aspect of the present invention, there is provided the polymer electrolyte fuel cell according to the third aspect, wherein the seal member has a lower rigidity than that of the electrode portion of the membrane electrode assembly in a stacking direction of the single cell modules, each of the first elastic members and second elastic members are arranged such that the load per unit area which is created by the elasticity of each of the first elastic members is lower than the load per unit area which is created by the elasticity of each of the second elastic members.

According to a ninth aspect of the present invention, there is provided the polymer electrolyte fuel cell according to the third aspect, wherein Each of the fastening members is a fastening bolt which fastens in such a manner as to pass through each of the end plates and separator plates and the first elastic member and second elastic members are each a spring member.

Effects of the Invention

The polymer electrolyte fuel cell according to the present invention is provided with the plurality of first elastic members interposed between each fastening member and the end plate and the plurality of second elastic members arranged between the end plate and the end part of the fuel cell stack, wherein each second elastic member is arranged in the second elastic member arrangement region on the surface of the end plate corresponding to an electrode portion of the membrane-electrode assembly in each single cell module. Therefore, the load (fastening force) applied to the electrode portion can be controlled separately from the load applied to members (for example, seal member) other than the electrode portion.

Moreover, in each single cell module, each first elastic member is arranged in the first elastic member arrangement region on the surface of the end plate corresponding to a region where the seal member is arranged between the periphery of the membrane electrode assembly and the pair of separator plates so as to surround the electrode portion of the membrane electrode assembly. Therefore, the load applied to the seal member arrangement region can be controlled separately from the load applied to the electrode portion.

Specifically, in the seal member arrangement region, the load necessary to secure the seal function of the seal member can be imparted to the fuel cell stack by interposing the fastening member and the end plate by the elastic force of the first elastic members. At the same time, in the electrode portion, a proper contact load required for power generation between the membrane electrode assembly and the separator plate can be imparted to the fuel cell stack by the elastic force of the second elastic member while suppressing its variation.

Therefore, a polymer electrolyte fuel cell can be provided using a fastening structure which is reduced in the variation of contact pressure between the membrane electrode assembly and the separator plate and, applies proper fastening force to the seal member arranged between the separator plates.

BRIEF DESCRIPTION OF DRAWINGS

These aspects and features of the present invention will become clear from the following description taken in conjunction with the preferred embodiments thereof with reference to the accompanying drawings, in which.

DETAILED DESCRIPTION OF THE INVENTION

Figure 1:
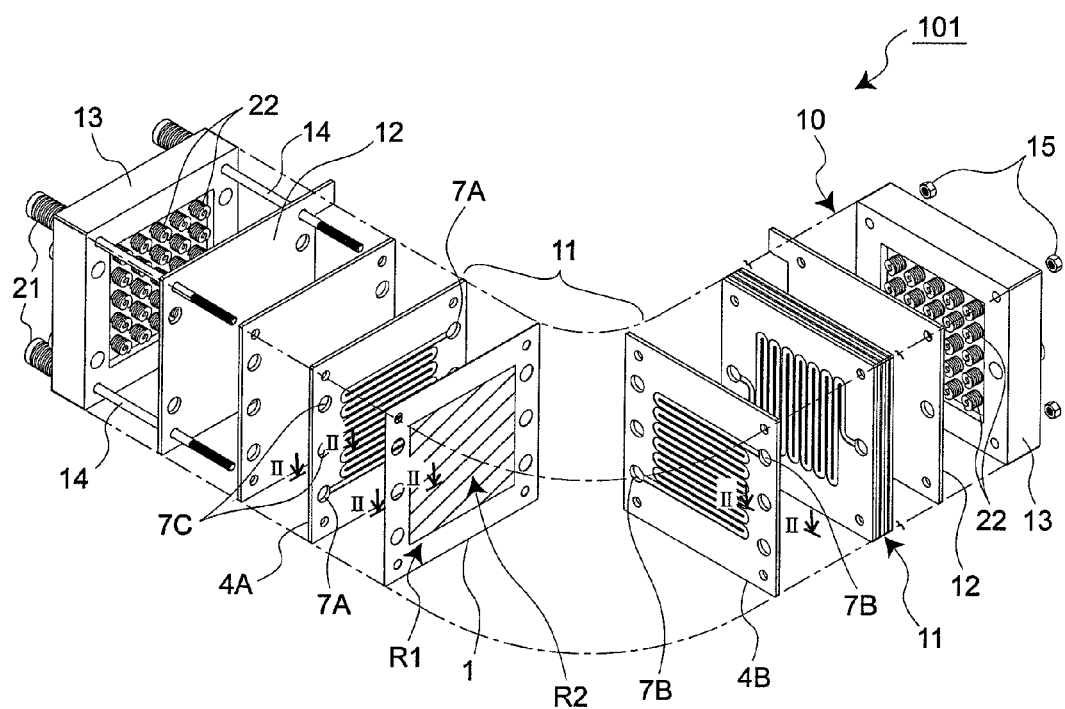
FIG. 1 is an exploded perspective view of a fuel cell according to an embodiment of the present invention.

Before the description of the present invention proceeds, it is to be noted that like parts are designated by like reference numerals throughout the accompanying drawings.

Hereinbelow, an embodiment of the present invention will be described in detail with reference to the accompanying drawings.

First Embodiment

Figure 2:
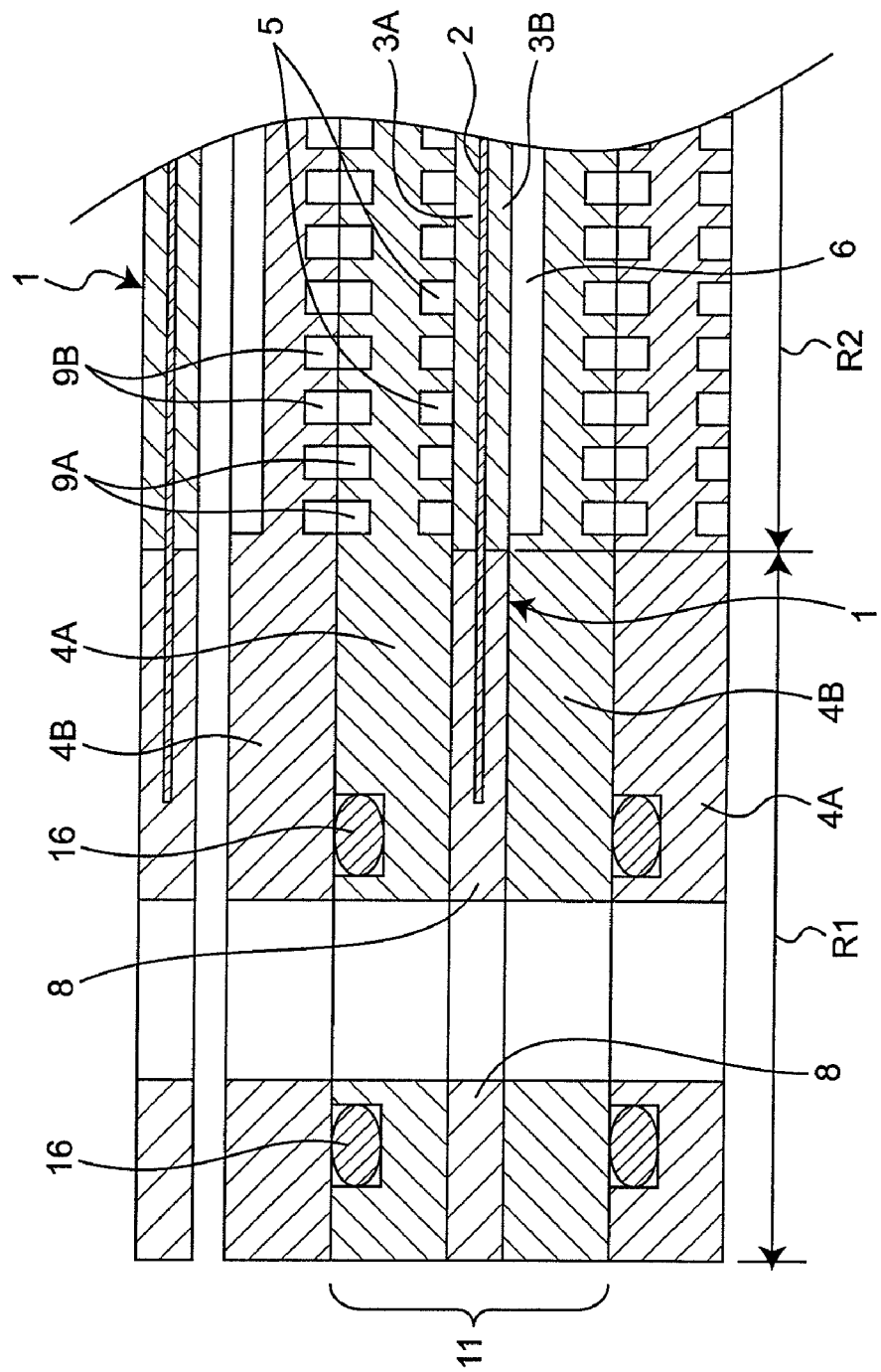
FIG. 2 is a partial schematic sectional view of a single cell module in the fuel cell of FIG. 1.

FIG. 1 is a schematic perspective view showing the structure of a fuel cell 101 in a partly exploded state as an example of a polymer electrolyte fuel cell (PEFC) according to an embodiment of the present invention. As shown in FIG. 1, the fuel cell 101 is constituted by laminating a plurality of single cell modules. Further, FIG. 2 shows a partial schematic sectional view (sectional view along the line II-II) of the periphery of the single cell module in the fuel cell 101 of FIG. 1.

As shown in FIG. 1, the fuel cell 101 is constituted in the condition where a plurality of single cell modules 11 which are respectively a unit structure of a generator in a fuel cell are stacked, by arranging a pair of current collecting plates 12 and a pair of end plates 13 on both ends of the stacked cells to the sandwiched, which are then fastened with fastening bolts 14 passing through bolt holes and nuts 15(an example of the fastening member). Here, a material obtained by stacking and fastening the plurality of single cell modules 11 is called a fuel cell stack 10. Here, in this embodiment, for example, 60 pieces of single cell modules (referred to as "cells") are stacked to constitute a fuel cell stack 10.

Next, the specific structure of the single cell module 11 will be described. As shown in FIGS. 1 and 2, the single cell module 11 is constituted by sandwiching MEA 1 between a pair of electro conductive separator plates, specifically, an anode side separator plate 4A and a cathode side separator plate 4B which are arranged on both sides of MEA 1. MEA 1 has a structure provided with a polymer electrolyte membrane 2 and a pair of electrodes, specifically, an anode electrode 3A and a cathode electrode 3B, which are formed on both sides of the polymer electrolyte membrane 2. These electrodes 3A and 3B are respectively constituted of a catalyst layer formed on the surface of the polymer electrolyte membrane 2 and a gas diffusion layer arranged on the outside surface of this catalyst layer. Further, a fuel gas flow passage groove 5 for forming a fuel gas flow passage on the MEA 1 side surface of the anode side separator plate 4A and an oxidizer gas flow passage groove 6 for forming an oxidizer gas flow passage is formed on the MEA 1 side of the cathode side surface separator plate 4B.

The gas diffusion layers arranged on the outermost side of each of the electrodes (electrode portions) 3A and 3B in MEA 1 are in contact with the separator plates 4A and 4B respectively, and the fuel gas flow passage groove 5 of the anode side separator plate 4A is covered with the gas flow diffusing layer to form the fuel gas flow passage. At the same time, the oxidizer gas flow passage groove 6 of the cathode side separator 4B is covered with the gas diffusion layer to form the oxidizer gas flow passage. When fuel gas is made to flow through the fuel gas flow passage formed in this manner, the gas diffusion layer of the anode electrode 3A is exposed to the flowing fuel gas, and at the same time, the gas diffusion layer of the cathode electrode 3B is exposed to oxidizer gas when the oxidizer gas is made to flow through the oxidizer gas flow passage. As a result, in each of the electrodes 3A and 3B, a prescribed electrochemical reaction occurs to generate electric power in the single cell module 11. In each of the stacked single cell modules 11, the fuel cell 101 has a structure in which MEAs 1 in neighboring single cell modules 11 are electrically connected in series or are electrically connected in parallel among them to be able to draw the power generated by the fuel cell 101 as a whole.

Further, a fuel gas manifold hole 7A and an oxidizer gas manifold hole 7B which are through-holes communicating the fuel gas flow passage groove 5 and oxidizer gas flow passage groove 6 respectively are formed in the periphery of each of the separator plates 4A and 4B in the single cell module 11. In the condition where the single cell modules 11 are stacked, these manifold holes 7A and 7B are stacked and bound to form a fuel gas manifold and an oxidizer gas manifold which are respectively a communicated flow passage.

Moreover, water manifold holes 7C for forming two pairs of manifolds through which water flows are formed in the periphery of each of the separator plates 4A and 4B similarly to the fuel gas manifold 7A and oxidizer gas manifold hole 7C. Similarly, in the condition that the single cell modules 11 are stacked, these manifold holes 7C are stacked and bound to form a water manifold which is a communicated flow passage.

Further, as shown in FIG. 2, the electrodes 3A and 3B are not formed on the periphery of the polymer electrolyte membrane 2 of MEA 1 and this peripheral part is formed as a gasket portion (an example of a seal member) 8 having a seal function. Specifically, the electrodes 3A and 3B are arranged on the inside of the periphery of MEA 1. The gasket portion 8 is formed of an elastic body so as to sandwich the periphery of the polymer electrolyte membrane 2. As shown in FIG. 2, the gasket portion 8 is arranged in the condition where it is sandwiched between the pair of separator plates 4A and 4B in the single cell module 11. In this condition, the gasket portion 8 seals to prevent the fuel gas and the oxidizer gas supplied to the electrodes 3A and 3B of MEA 1 from leaking out of the single cell module 11 and furthermore to prevent two types of gases from being mixed. Moreover, the gasket portion 8 is formed with holes at positions corresponding to each of the manifold holes 7A to 7C, and seals the periphery of the manifold holes in the condition that it is sandwiched between each of the separator plates 4A and 4B. Here, in this embodiment, the gasket portion 8 will be described in a configuration where it is formed integrally as a part of MEA 1. However, the fuel cell 101 of this embodiment is not limited to such a configuration and the present invention may have a configuration where the gasket 8 is formed separately from MEA 1. Further, in this embodiment, the region where the gasket portion 8 is formed is defined as a gasket arrangement region (an example of a seal member arrangement region) R1 and the region where the electrodes 3A and 3B are formed is defined as an electrode arrangement region (an example of a region where the electrode portion is arranged or a power generation region) R2.

The anode side separator plate 4A and the cathode side separator plate 4B respectively have a plane form, and the surfaces of these plates on the side which is in contact with MEA 1, that is, the inside surfaces in the single cell module 11 are formed so as to have shapes corresponding to the surface shapes of the electrode arrangement region R2 and the gasket arrangement region R1 in MEA 1. Although in the schematic view of FIG. 2, the surface shape of MEA 1 and the surface shapes of the separator plates 4A and 4B which are in contact with MEA 1 respectively have a flat form, MEA 1 is formed such that its surface has a rise in order to secure the function of the gasket portion 8 particularly in the gasket arrangement region R1. Further, in this embodiment, for example, grassy carbon (thickness: 3 mm) manufactured by Tokai Carbon Co., Ltd. is used for the anode side separator plate 4A and the cathode side separator plate 4B. Further, the separator plates 4A and 4B are provided with various manifold holes and bolt holes so as to pass through in the thickness direction thereof at the ends of these separators 4A and 4B. Further, water flow passage grooves 9A and 9B are formed on each backside of the separator plates 4A and 4B. In the separator plates 4A and 4B, various manifold holes, bolt holes, fuel gas flow passage grooves, oxidizer gas flow passage grooves, water flow passage grooves and the like are formed by cutting processing or molding processing.

Further, the water flow passage grooves 9A and 9B are formed so as to connect two pairs of water manifold holes 7C. Namely, these grooves are formed such that water is supplied from the supply side manifold, branched into the water flow passages 9A and 9B and flowed into the discharge side manifold. Since this structure is adopted, the single cell module 11 can be kept at a given temperature fitted to an electrochemical reaction by utilizing the heat-conductive ability of water. Here, the present invention may have the configuration where similar to the configuration of the fuel gas and oxidizer gas, no water manifold is formed in the peripheries of the separators 4A and 4B and MEA 1, but an external manifold structure in which a cooling water supply and discharge passage is formed outside of the separator is adopted. Moreover, the present invention may have the configuration where no water flow passage groove is formed on the backside of the separator plate, but a cooling unit in which cooling water is circulated is inserted between neighboring single cell modules 11 to stack the single cell modules 11.

Further, as shown in FIG. 2, a packing 16 which is a general seal member such as a squeezed packing made of a heat resistant material is arranged on each periphery of various manifold holes on the backside of the anode side separator plate 4A and the cathode side separator plate 4B. This structure prevents the leakage of fuel gas, oxidizer gas and water from the parts connecting the modules of various manifold holes with each other between neighboring single cell modules 11.

As the current collecting plate 12 is arranged on the outside of the fuel cell stack (single cell module stack) 10 and uses a material obtained by plating a copper plate with gold to make it possible to collect generated electricity efficiently. Besides the above material, metal materials having high electro conductivity, such as iron, stainless and aluminum may be used as the current collecting plate 12. Further, as the surface treatment, tin plating, nickel plating and the like may be adopted. Though an insulating plate for insulating electricity is usually arranged on the outside of the current collecting plate 12, the end plate 13 using an electrically insulating material serves as the insulating plate in this embodiment. Here, as the end plate 13, a material produced using, for example, a polyphenylene sulfide resin by injection molding is used. Here, the end plate 13 is provided with pipes (not shown) integrated with the end plate 13. These pipes are formed in such a manner that they are communicated with various manifolds to supply or discharge fluids. Further, in this embodiment, the term "fuel cell stack" includes, besides the case where it means the fuel cell stack itself, the case where it means the fuel cell stack including current collecting plates 12 in a structure in which the current collecting plates 12 are arranged on the outside of the fuel cell stack 10 (namely, a structure as shown in FIG. 1). Accordingly, in a structure as shown in FIG. 1, the term "end part of the fuel cell stack" means the end part of each current collecting plate 12.

Next, in the fuel cell 101 of this embodiment, a configuration which provides a fastening structure which reduces a variation in contact pressure between MEA 1 and the separator plates 4A or 4B and applies proper fastening force to the gasket portions 8 arranged between the separators when the fuel cell stack 10 which is a stacked body of single cell modules 11 is fastened with the pair of end plates 13, the fastening bolts 14 and the nuts 15.

As shown in FIG. 1, four outside springs 21 which are respectively an example of the first elastic member are arranged at the outside corner parts of the end plate 13. A fuel cell stack 10 sandwiched between the pair of end plates 13 is fastened with the fastening bolts 14 and nuts by interposing these four outside springs 21, wherein the elastic force created by the compression of the outside springs 21 is applied as the fastening load to each single cell module by interposing the end plate 13. Further, a recessed portion 23 is formed on the inside surface of the end plate 13 having a square form so as to leave its end part in a square frame form. The inside bottom surface 23a of the recessed portion 23 is formed in a flat form and 25 pieces of inside springs 22 which are respectively an example of the second elastic member are arranged at equal intervals on this inside bottom surface 23a. Each inside spring 22 is compressed through the current collecting plate 12 in the recessed portion 23 to thereby apply its elastic force to each single cell module 11.

Figure 3A:
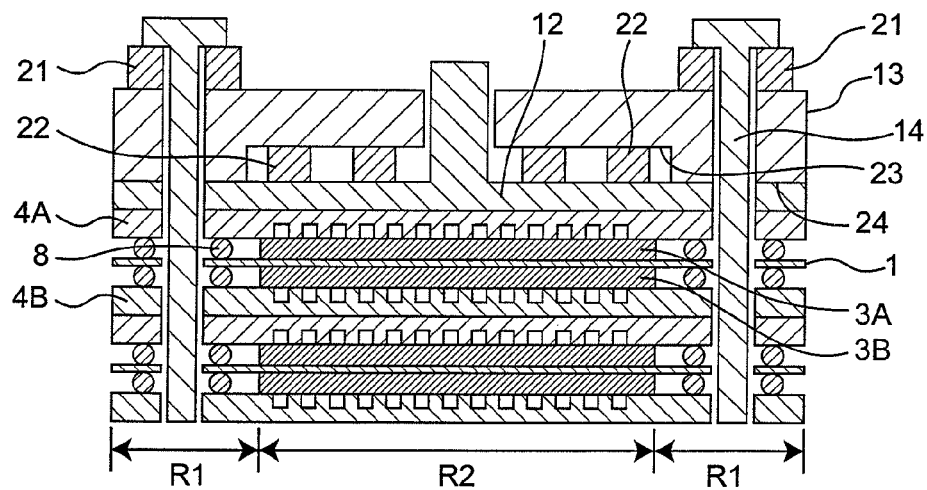
FIG. 3A is a partial schematic sectional view of the fuel cell in the above embodiment.
Figure 3B:
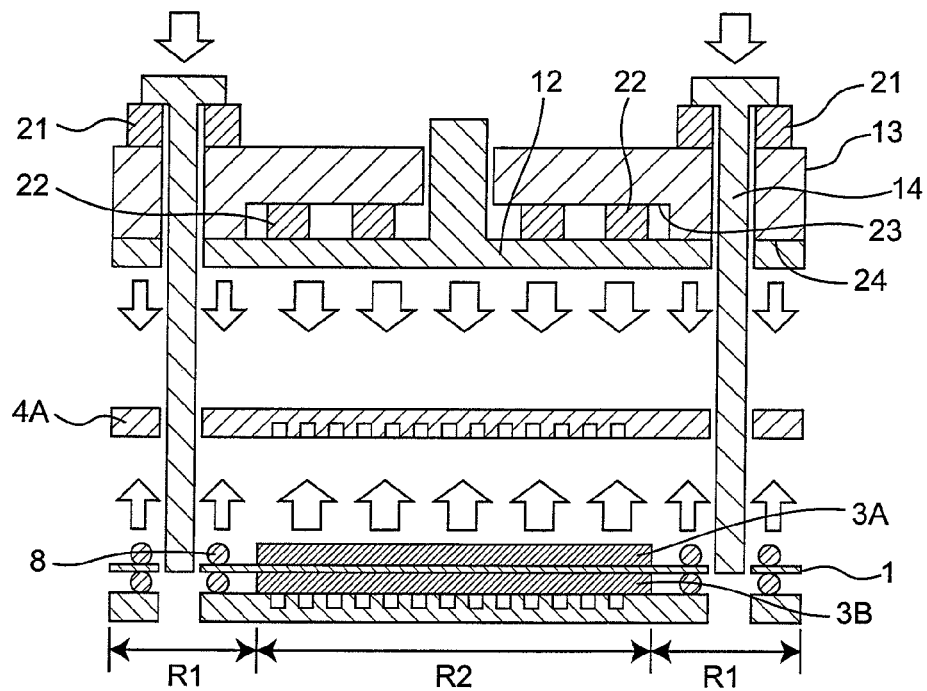
FIG. 3B is a partial schematic sectional view showing the state of an exploded fastening structure of FIG. 3A.

Here, a schematic view showing the fastening structure in the fuel cell 101 of this embodiment in the vicinity of one of the end plates 13 is shown in FIG. 3A and an exploded view of the fastening structure is shown in FIG. 3B.

As shown in FIGS. 3A and 3B, 25 pieces of inside springs 22 are arranged at equal intervals in the recessed portion 23 formed on the surface of the fuel cell stack 10 side surface (hereinafter referred to as "inside surface") in the end plate 13. These inside springs 22 are arranged in such a manner that each is sandwiched between the current collecting plate 12 arranged between the separator of the single cell module 11 positioned at the end part of the stack 10, for example, the anode side separator plate 4A and the end plate 13, and the inside bottom surface 23a of the recessed portion 23 of the end plate 13. The recessed portion 23 of this end plate 13 is formed such that its arrangement (inside spring arrangement region) almost corresponds to the electrode arrangement region R2 in the single cell module 11. For this reason, such a structure is achieved that in the situation where the end plate 13 is fastened, the elastic force created by compressing each inside spring 22 is positively applied to the electrode arrangement region R2 in each single cell module 11.

Further, the square frame-form edge (hereinafter referred to as "frame portion 24") formed on the periphery of the recessed portion 23 on the inside surface of the end plate 13 is arranged so as to be in direct contact with the surface of the current collecting plate 12. Specifically, the frame portion 24 of the end plate 13 is arranged in direct contact with the surface of the current collecting plate 12 (namely, arranged in direct contact with "the end part of the fuel cell stack") without interposing any elastic member such as the inside springs 22 and the outside springs 21. The frame portion 24 of the end plate 13 is formed such that its arrangement (outside spring arrangement region) almost corresponds to the gasket arrangement region R1 in the single cell module 11. Moreover, in the end plate 13, a hole for passing the fastening bolt 14 is formed in each corner of the frame portion 24 and this hole is arranged so as to accord to the bolt passing hole formed on each single cell module 11. On the outside surface of the end plate 13, the outside spring 21 is arranged at the position where the bolt passing hole is formed and each fastening bolt is arranged so as to pass through the center of this outside spring 21 and furthermore to pass through each bolt passing hole. This constitution results in realization of such a structure that when the fastening bolts 14 are engaged with the nuts 15 to fasten, the outside springs 21 are compressed between the head of the fastening bolts 14 and the outside surface of the end plate 13 to produce elastic force which is then positively applied to the gasket arrangement region R2 in each single cell module 11 through the frame portion 24 of the end plate 13.

Specifically, the fastening structure in the fuel cell 101 of this embodiment is provided with the outside springs 21 that positively apply fastening load to the gasket arrangement region R1 in the single cell module 11 by their elastic forces and the inside springs 22 that positively apply fastening load to the electrode arrangement region R2 by their elastic forces. Thus, such a fastening structure is achieved in which the contact pressure required for efficient power generation is applied between the electrodes 3A and 3B of MEA 1 and the separators 4A and 4B, and at the same time, the variation generated depending on the position of the contact force is reduced and a proper fastening load being different from the above contact force is applied to the gasket portion 8 arranged between the separators 4A and 4B.

Further, a structure is adopted in which in the end plate 13, the recessed portion 23 and the frame portion 24 are formed on the inside surface of the end plate 13, the outside springs 21 allow the frame portion 24 to fasten each single cell module by interposing the current collecting plate 12, and at the same time, in such a fastening condition, the inside springs 22 arranged in the recessed portion 23 of the end plate 13 are sandwiched between the end plate 13 and the current collecting plate 12 to be put into a compressed state, thereby applying the elastic force to each single cell module 11 by interposing the current collecting plate 12 without interposing the end plate 13. This structure thereby makes it possible to achieve the application of a load by independent elastic forces of two kinds of springs 21 and 22. Here, the magnitudes of the loads to be applied in such a fastening structure are designed based on the specifications, such as spring constant, of the springs 21 and 22, as for the outside springs 21, the amount of compression of the outside spring 21 due to the fastening force of the fastening bolt 14 and as for the springs 22, the dimension of the depth of the recessed portion 23 of the end plate 13.

In the fastening structure of the fuel cell 101 of this first embodiment, it is possible to apply, for example, a load of 1 kgf/cm$^2$ as a load per unit area to the gasket arrangement region R1 of the single cell module 11 and a load of 4 kgf/cm$^2$ to the electrode arrangement region R2 (value obtained by dividing the applied load by the whole area of the electrode arrangement region R2). Accordingly, it is possible to apply a relatively low load to fasten a low-rigidity region where the gasket portion 8 is arranged which is the outer periphery of the single cell module 11 and a relatively high load to fasten a high-rigidity region where the electrodes 3A and 3B of the inside of MEA 1 are arranged. As a result, the deformation of each of the separators 4A and 4B is suppressed to thereby be able to apply a load uniformly to the electrode arrangement region R2 of MEA 1. Further, according to this embodiment, the structure using the inside springs 22 and outside springs 21 to apply almost uniform loads to the electrode arrangement region R2 and the gasket arrangement region R1 is adopted. Therefore, even if MEA 1 is changed in its shape in such a manner that it is partly expanded by thermal influence, the change can be absorbed by the spring to thereby cope with such a change in shape.

Here, the effect of the structure of arrangement of the outside and inside springs of the end plate 13 as mentioned above can be obtained as long as at least one of the pair of end plates 13 is provided with this structure in the fuel cell stack 10. However, it is preferable that both of the end plates be provided with this structure.

Further, in the above embodiment, the case where each outside spring 21 is arranged on the region (namely, the outside spring arrangement region) of the end plate 13 corresponding to the gasket arrangement region R1 in the single cell module 11 is described as an example. However, the present invention is not limited only to such a case. The present invention may be, instead of the above case, the case where the arrangement of the outside springs 21 on the outside surface of the end plate 13 is determined irrespective of the region of the arrangement of the outside springs. However, in the case of adopting such an arrangement structure, it is necessary that the frame portion 24 of the end plate 13 be formed so as to almost correspond to the gasket arrangement region R1.

Further, in the above embodiment, the case where the fastening bolt 14 and the nut 15 are used as an example of the fastening member is described. However, the present invention may be the case where a wire, a steel belt or the like is used as the fastening member instead of the above case.

WORKING EXAMPLES

In the fastening structure using the end plate and two kinds of springs in the present invention, the effect of making the distribution of load uniform is largely different by innovating to arrange the outside and the inside springs. Here, working examples (modifications) of the arrangement relation between such outside springs and inside springs will be referred and at the same time, the results of a simulation of the distribution of load.
(Common Structure)

First, specific formation materials and a production method of the single cell module 11 common to each example which will be described hereinafter will be described. An acetylene black carbon powder (DENKABLACK FX-35, manufactured by Denki Kagaku Kogyo Kabushiki Kaisha) carrying 25% by weight of platinum particles having an average particle diameter of 30 angstroms was used as the cathode catalyst. Further, an acetylene black carbon powder (DENKABLACK FX-35, manufactured by Denki Kagaku Kogyo Kabushiki Kaisha) carrying 25% by weight of platinum-ruthenium alloy (Pt:Ru=1:1) (weight ratio) particles having an average particle diameter of 30 angstroms was used as the anode catalyst. An ethyl alcohol dispersion solution of a perfluorocarbonsulfonic acid powder (Flemion FSS-1, manufactured by Asahi Glass Co., Ltd.) was mixed in an isopropanol dispersion solution of a powder of each catalyst to make each paste state. After that, each of these pastes was used as a raw material to form an electrode catalyst layer on one surface of each carbon nonwoven fabric (TGP-H-090, manufactured by Toray Industries, Inc.) having a thickness of 250 μm by using a screen printing method. The amount of platinum contained in the catalyst layer of the electrode formed in this manner was 0.3 mg/cm$^2$ and the amount of perfluorocarbonsulfonic acid was 1.2 mg/cm$^2$.

The structures of these electrodes for the cathode and anode were the same except for the catalyst material. These electrodes were bound with each center part of both surfaces of a proton conductive polymer electrolyte membrane (NAFION 122, manufactured by Du Pont) having an area one size larger than the electrode in such a manner that the printed catalyst layer was in contact with the electrolyte membrane side by hot pressing. Further, the periphery of the polymer electrolyte membrane exposed to the outer circumference of the electrode was sandwiched with a gasket made of a sheet of a fluoro-rubber (Afras, manufactured by Asahi Glass Co., Ltd.) having a thickness of 250 μm and bound by hot pressing to be integrated. Thus, an electrolyte membrane electrode assembly (MEA) was manufactured. As the proton conductive polymer electrolyte membrane, a membrane obtained by reducing the thickness of a membrane of perfluorocarbonsulfonic acid to 30 μm was used.

Further, a gas flow passage and a manifold hole were formed on an isotropic graphite plate having a thickness of 3 mm to thereby form an electro conductive separator. The gas flow passage was designed so that the groove width was 2 mm, the depth was 1 mm and the width between flow passages was 1 mm and two-pass structure was adopted in each gas flow passage. The flow passage of cooling water was the same as the gas flow passage except that the depth of the groove was 0.5 mm. The rated operation condition of this cell was as follows: utilization ratio of fuel: 75%, utilization ratio of oxygen: 40% and current density: 0.3 A/cm$^2$.

50 single cell modules (cells) obtained by sandwiching MEA between the cathode side separator and the anode side separator as described above were stacked. The flow passage of cooling water is formed with both separator plates between neighboring cells. This cell stack was sandwiched between a copper made current collecting plate having a thickness of 5 mm in which the surface was plated with gold and an end plate made of polyphenylene sulfide and the both end plates were fastened with a fastening rod.

Working Example 1

Figure 4A:
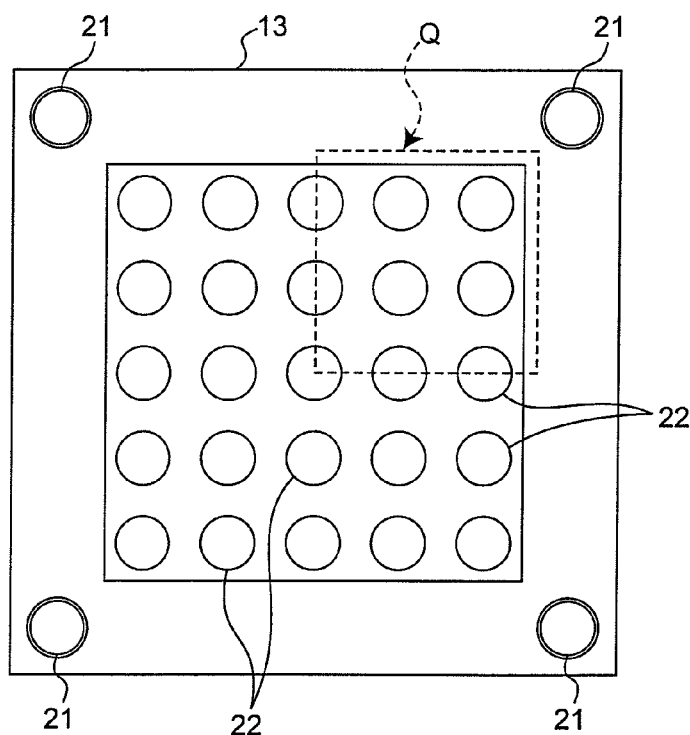
FIG. 4A is a schematic plan view showing the fastening structure of Working Example 1 of the present invention.

Here, using the fastening structure of the above embodiment of FIG. 1 as Working Example 1, the arrangement relation between the outside springs 21 and the inside springs 22 in the end plate 13 is shown in FIG. 4A. As shown in FIG. 4A, in the fastening structure of Working Example 1, 25 pieces of inside springs 22 were arranged in the recessed portion 23 between the end plate 13 and the current collecting plate 12 as shown in FIG. 1 and also 3A. A spring having a spring constant of 7 kgf/mm was used as the inner spring 22 and was made to shrink by 4.8 mm from its free length to create a load of 840 kgf. Further, a spring having a spring constant of 50 kgf/mm was used as the outside spring 21 on each of the four corners of the outside surface of the end plate 13 and these springs 21 were shrunk by 5 mm from its free length to create a load of 1000 kgf, thereby fastening by the nut 15.

Figure 4B:
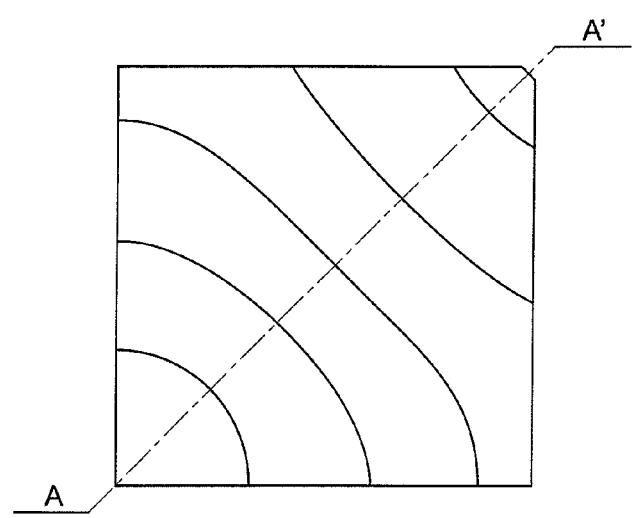
FIG. 4B is a graph showing the result of the simulation of the distribution of contact pressure in the fastening structure of Working Example 1.

Further, in order to confirm the distribution of pressure in the electrode arrangement region of MEA, a simulation was carried out using a ¼ model and a structure analysis soft (ABAQUS Version 6.4). Here, the ¼ model is a model corresponding to the region Q enclosed by the dotted line shown in FIG. 4A. The results of simulation calculation of contact pressure created in the electrode arrangement region of MEA in the fastening structure of Working Example 1 are shown in FIG. 4B. The graph of FIG. 4B shows the degree of the uniformity and the degree of a variation in contact pressure in the ¼ model corresponding to the region Q. In the case where the number of isobaric lines is large or the interval between isobaric lines is narrow in the figure, this graph shows that the distribution of pressure varies widely, whereas in the case quite opposite to the above case, the graph shows that the uniformity of the distribution of pressure is high. It is understood from the graph of FIG. 4B that though the contact pressure tends to rise extending towards the corner end part position A' from the center position A in the electrode arrangement region R2, the degree of the rise is suppressed to a small level. Further, in order to confirm the result of the simulation, pressure sensitive paper (manufactured by Fuji Film Corporation) was sandwiched between MEA and the separator in the single cell module of Example 1 to confirm the contact pressure, to find that the same results as those obtained in the simulation were obtained.

Comparative Example

Figure 5A:
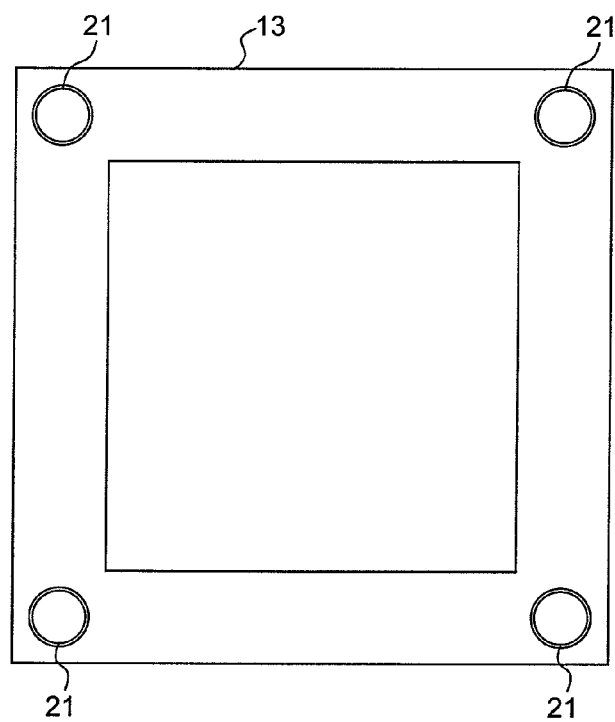
FIG. 5A is a schematic plan view showing the fastening structure of Comparative Example in the present invention.
Figure 5B:
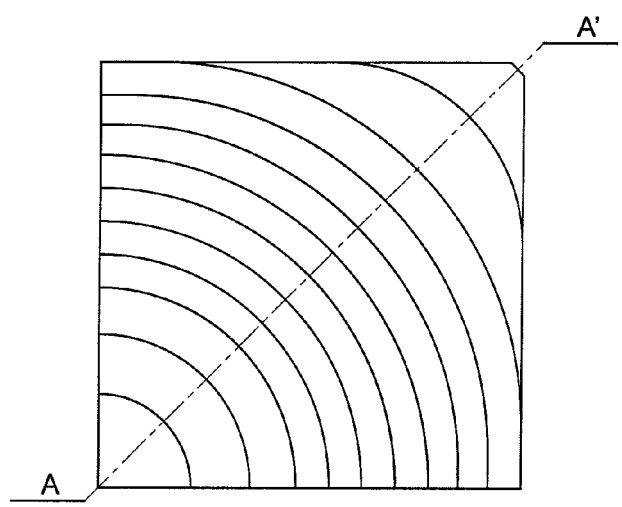
FIG. 5B is a graph showing the results of simulation of the distribution of contact pressure in the fastening structure of Comparative Example.

Next, as a comparative example with the fastening structure of Working Example 1, a structure in which four outside springs 21 are arranged on the corners of the outside surface of the end plate 13 and no inside spring 22 is arranged is shown in FIG. 5A. Further, the results of simulation of ¼ model in such a structure are shown in FIG. 5B. Here, in this comparative example, as the cell stack, a product common to the examples was used, and this cell stack was sandwiched between the end plates made of stainless by interposing a copper made current collecting plate having a thickness of 5 mm in which the surface was plated with gold and an insulating plate made of polyphenylene sulfide to fasten the both end plates with fastening bolts. As the fastening load, a load of 1000 kgf was likewise applied. As shown by the results of simulation in FIG. 5B, since the number of isobaric lines is large and the interval between these isobaric lines is narrow, it was confirmed that the contact pressure tends to rise largely extending towards the corner end part position A' from the center position A in the electrode arrangement region R2. Therefore, it is understood that the fastening structure of Working Example 1 has the effect of reducing a difference between the maximum contact pressure and the minimum contact pressure to 10% from 25% based on the average contact pressure as compared with the fastening structure of Comparative Example.

Working Example 2

Figure 6A:
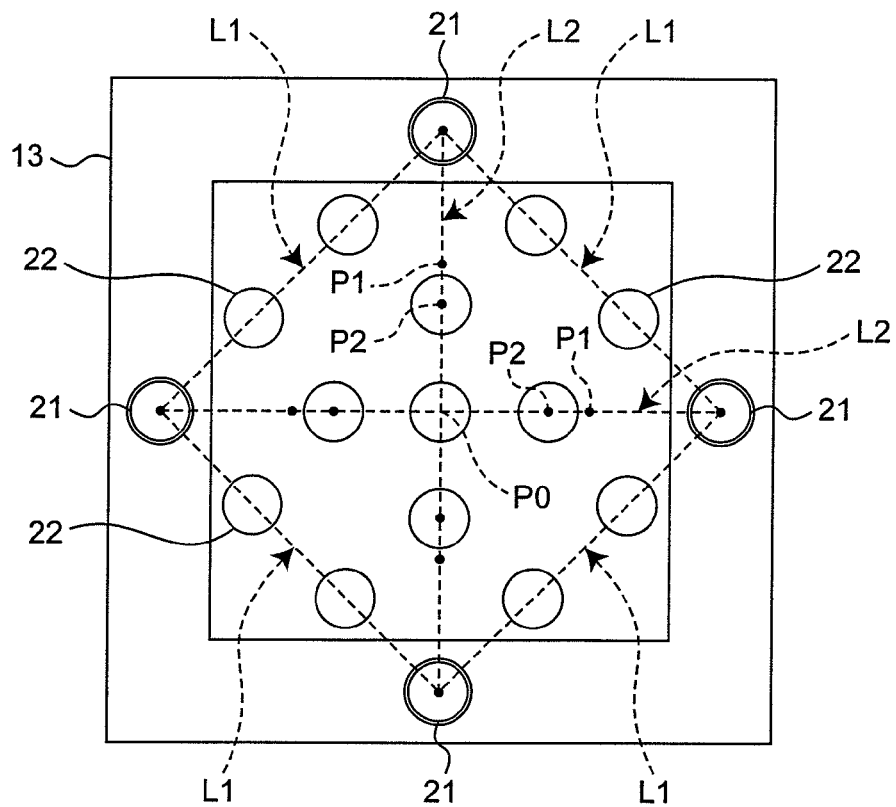
FIG. 6A is a schematic plan view showing the fastening structure of Working Example 2 of the present invention.

Next, a schematic view of the arrangement structure of the outside springs 21 and the inside springs 22 in the fastening structure of Working Example 2 in the present invention is shown in FIG. 6A.

In Working Example 2, as shown in FIG. 6A, the outside spring 21 is not arranged on the corners of the end plate 13, but four outside springs 21 are respectively arranged in the vicinity of the center of each edge in the end plate 13 having a square form. Further, each of the inside springs 22 are not arranged equally in the electrode arrangement region R2, but are arranged in such a manner that the center of the inside springs is positioned in an electrode arrangement region R2 on the inside of the square constituted of the line L1 connecting these four outside springs 21. Moreover, a plurality of inside springs are arranged on diagonal lines L2 of the square constituted of the line L1 connecting these four outside springs 21. First, one inside spring 22 is arranged on the center P0 (that is, the center of the square) of the diagonal line L2 and inside springs 22 are each arranged on the position P2 more shifted to the center P0 side than the center P1 on the line (part of the diagonal line L2) connecting the center P0 with the arrangement position of the outside spring 21 on this diagonal line L2. Here, each arrangement of the outside springs 21 and the inside springs 22 is designed to be an arrangement structure which is symmetrical with respect to the center position (P0). Further, the inside springs 22 are arranged in total 13.

Figure 6B:
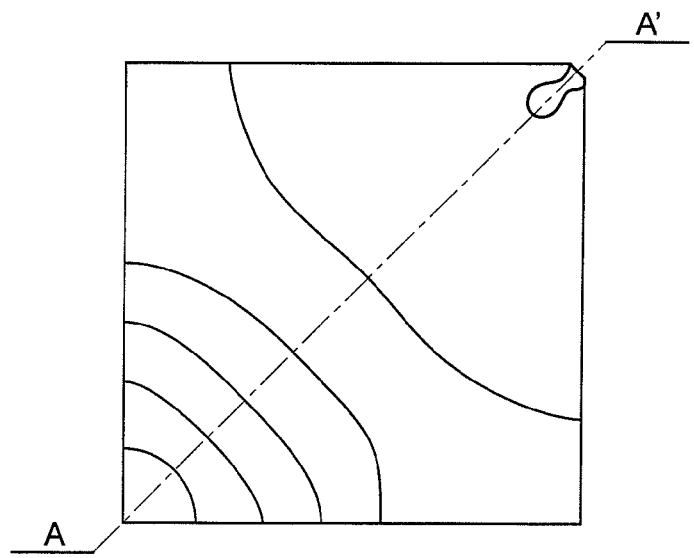
FIG. 6B is a graph showing the results of simulation of the distribution of contact pressure in the fastening structure of Working Example 2.

In such arrangement structure of Working Example 2, the ¼ model simulation calculation was likewise carried out. The results are shown in FIG. 6B. As is clear from the graph of FIG. 6B, it is found that the tendency to rise extending towards the corner end part position A' from the center position A in the electrode arrangement region R2 as shown in Working Example 1 and Comparative Example was improved and a difference between the maximum contact pressure and the minimum contact pressure is reduced to 5% based on the average contact pressure. As described above, it can be made to be difficult that the load applied by the outside spring 21 has an influence on the electrode arrangement region R2, for example, by positively arranging the inside springs 22 on the inside of the center P1 in relation to the arrangement position of the outside spring 21.

Working Example 3

Figure 7A:
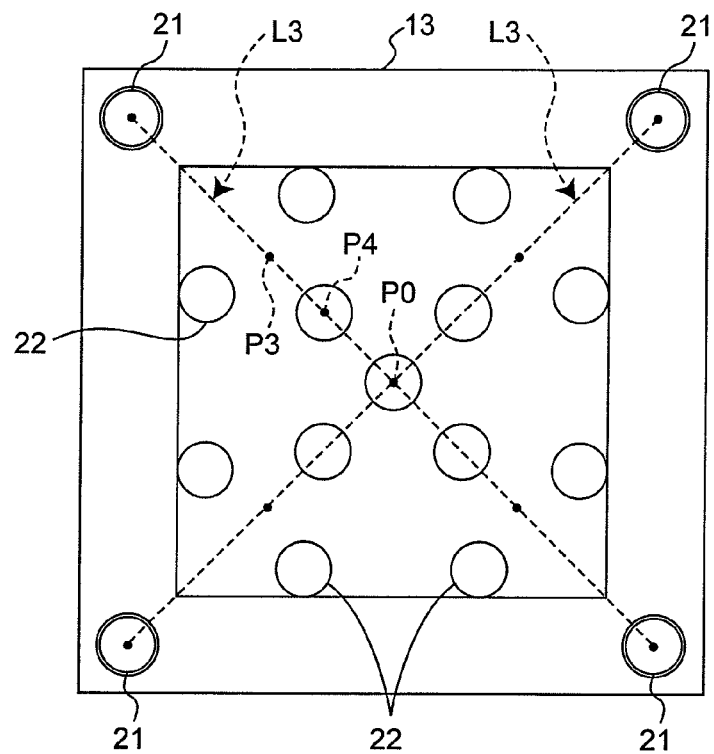
FIG. 7A is a schematic plan view showing the fastening structure of Working Example 3 of the present invention.

Next, a schematic view of the arrangement structure of the outside springs 21 and the inside springs 22 in the fastening structure of Working Example 3 of the present invention is shown in FIG. 7A.

In Working Example 3, as shown in FIG. 7A, an innovation is taken into account for the arrangement structure of the inside springs 22 in an embodiment in which the outside springs 21 are arranged on the corners of the end plate 13. Specifically, as shown in FIG. 7A, the inside springs 22 are not arranged equally in the electrode arrangement region R2, but a plurality of inside springs 22 are arranged on the line L3 connecting four outside springs 21, one inside spring 22 is arranged on the center P0 (namely, the center of the electrode arrangement region R2) of the line L3 and inside springs 22 are arranged on the position P4 more shifted to the center P0 side than the center P3 on the line (part of the diagonal line L3) connecting the center P0 with the arrangement position of the outside spring 21. Here, each arrangement of the outside springs 21 and the inside springs 22 is designed to be an arrangement structure which is symmetrical with respect to the center position (P0). Further, the inside springs 22 are arranged in total 13.

Figure 7B:
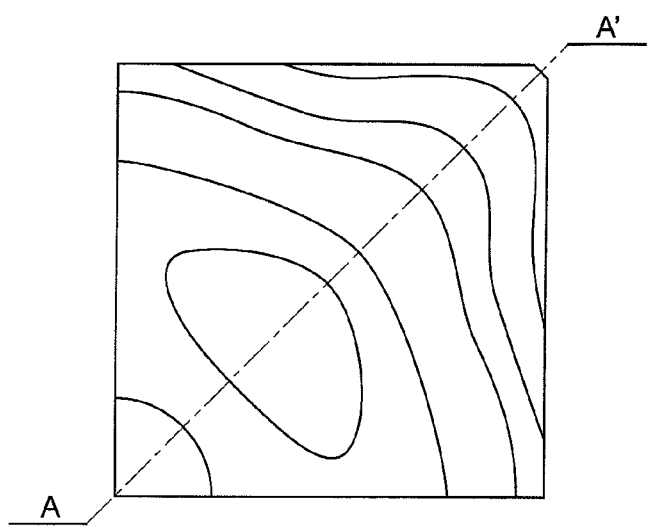
FIG. 7B is a graph showing the results of simulation of the distribution of contact pressure in the fastening structure of Working Example 3.

In such arrangement structure of Working Example 3, the ¼ model simulation calculation was likewise carried out. The results are shown in FIG. 7B. As is clear from the graph of FIG. 7B, it is found that the tendency to rise extending towards the corner end part position A' from the center position A in the electrode arrangement region R2 as shown in Working Example 1 and Comparative Example was improved and a difference between the maximum contact pressure and the minimum contact pressure is reduced to 5% based on the average contact pressure. As mentioned above, it can be made to be difficult that the load applied by the outside spring 21 has an influence on the electrode arrangement region R2, for example, by positively arrangement the inside springs 22 on the inside of the center P3 in relation to the arrangement position of the outside springs 21.

Figure 8:
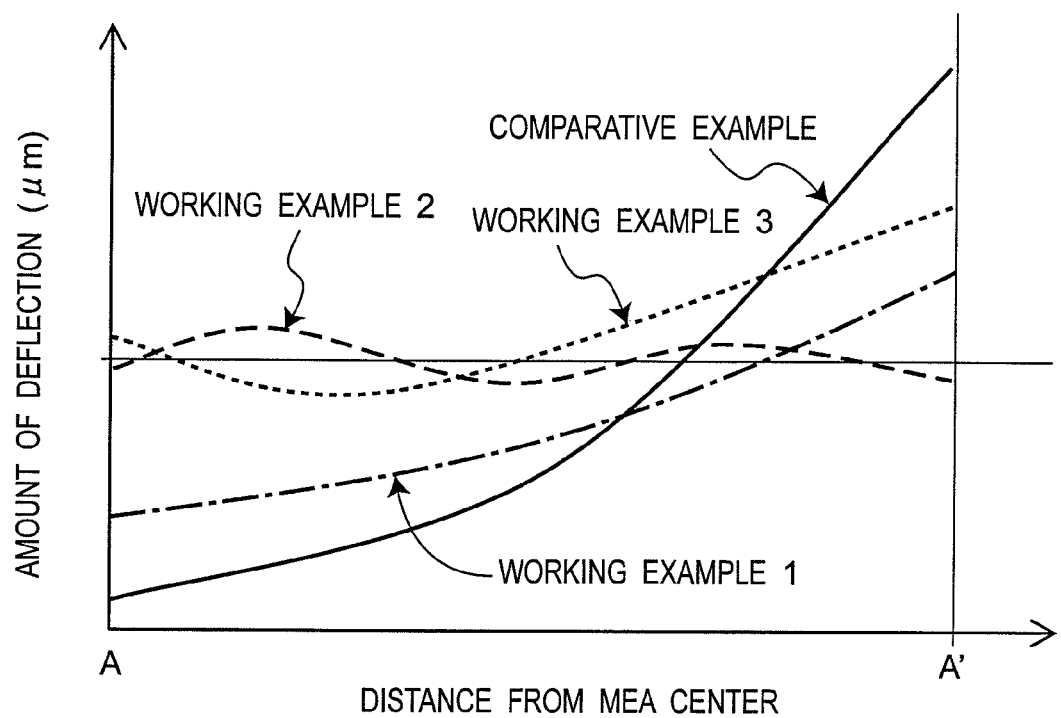
FIG. 8 is a graph showing the amount of deflection of each separator plate in the fastening structures of Working Examples 1 to 3 and Comparative Example.

FIG. 8 is a graph showing the amount of deflection of MEA (or a separator plate) extending from the center position A of the electrode arrangement region R2 to the corner end position A' in Working Examples 1 to 3 and Comparative Example.

As is clear from the graph of FIG. 8, it is found that in Comparative Example in which no inside spring is arranged, a change in the amount of deflection of the corner end part position A' based on the center position A is larger than those in Working Examples 1 to 3. Further, in Working Example 1, it is understood that though the amount of deflection tends to rise as the position is closer to the corner end part position A', the amount of rise is suppressed compared with Comparative Example. Further, Working Example 3 is improved in the effect of suppressing the amount of deflection in the vicinity of the center position A compared with Working Example 1. Moreover, it is understood that in Working Example 2, the rising trend in the amount of deflection as the position being closer to the corner end part position A' is suppressed, thereby making the amount of deflection is uniformed.

Figure 9:
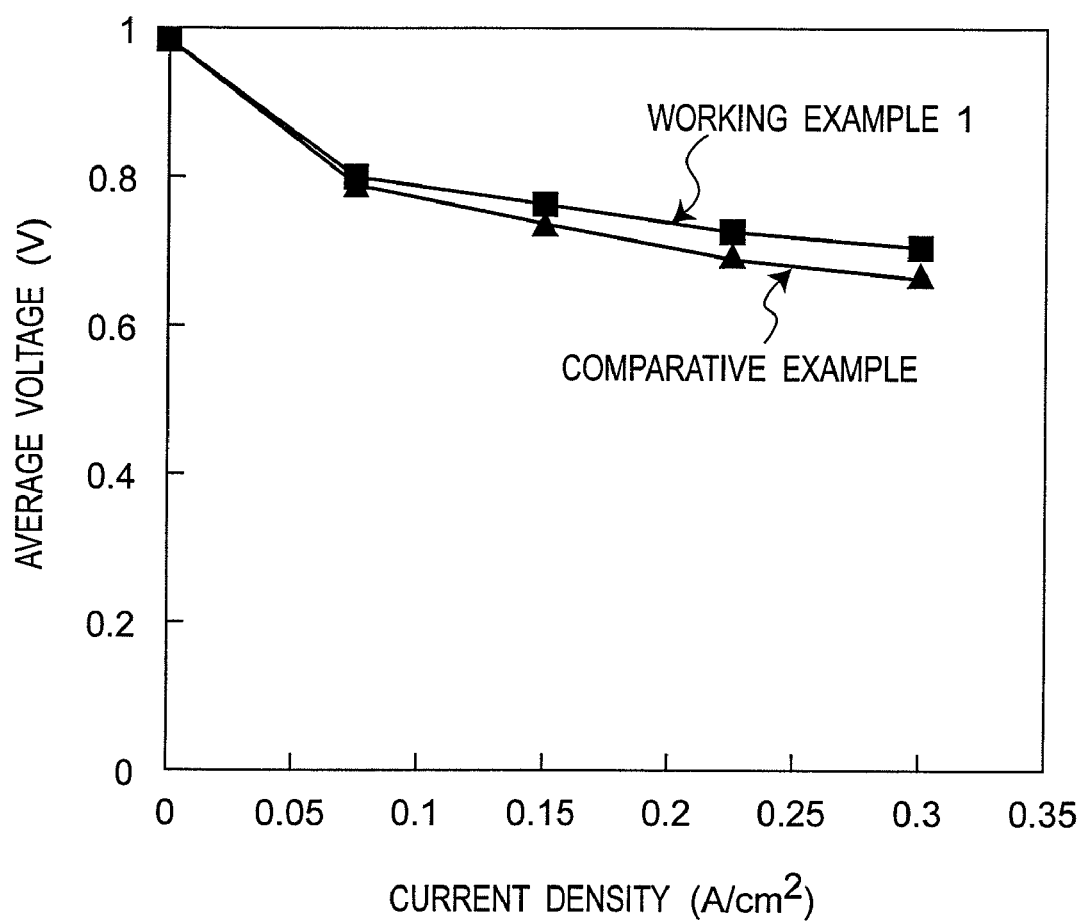
FIG. 9 is a graph showing the current-voltage characteristic of each fuel cell obtained in Working Example 1 and Comparative Example.

Next, the fuel cell of Working Example 1 was kept at 70° C., then, fuel gas (hydrogen gas: 80%, carbon dioxide: 20% and carbon monoxide: 10 ppm) humidified and heated to obtain a dew point of 70° C. was supplied to the anode and air humidified and heated to obtain a dew point of 70° C. was supplied to the cathode, respectively. The current density was made to vary between 0.075 A/cm$^2$ required by 25% of the rated load which was a low load and 0.3 A/cm$^2$ required by the rated load to evaluate the current-voltage characteristics of the fuel cell. However, the utilization ratio in the test was made to be equal to the rated condition. The results are shown in FIG. 9. Here, FIG. 9, the characteristics of the fuel cell in Comparative Example are described together.

Figure 10:
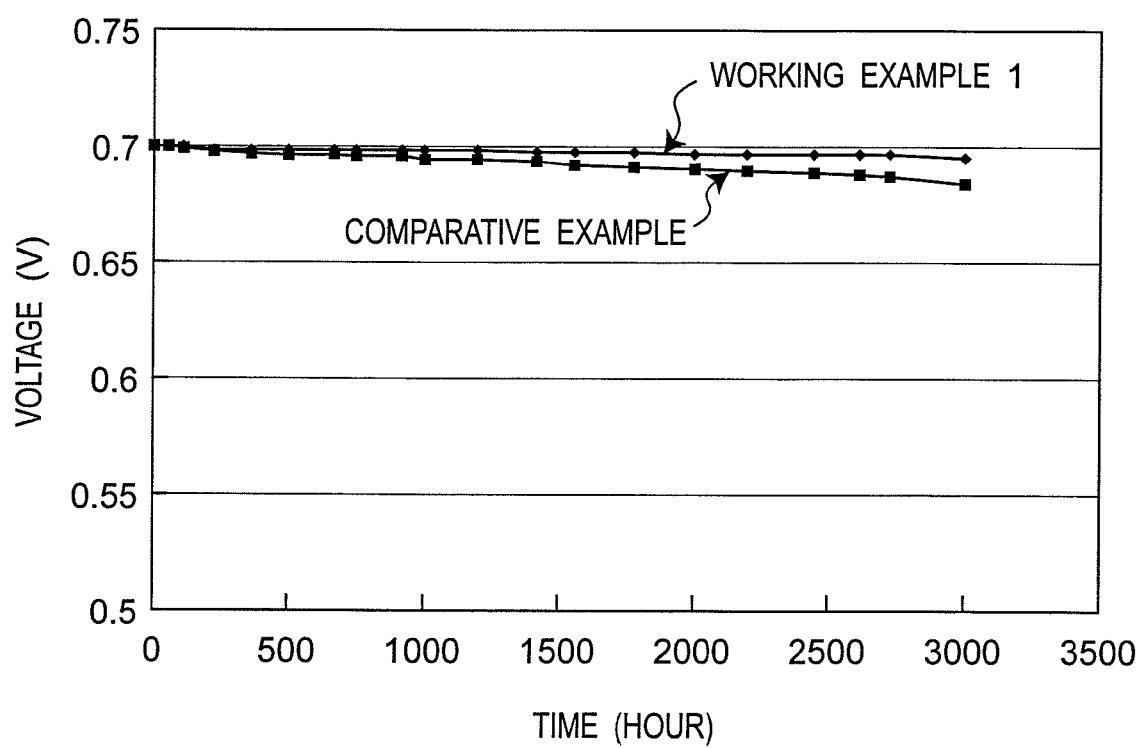
FIG. 10 is a graph showing the voltage durability characteristic of each of Working Example 1 and Comparative Example 1.

As shown in FIG. 9, the fuel cell of Comparative Example is partly increased in contact resistance due to the distribution of load, bringing about a reduction in cell voltage, whereas the fuel cell of Working Example 1 keeps high voltage. In view of this, a load was applied to the fuel cell of Comparative Example until the same cell characteristics were obtained to decrease the contact resistance, with the result that the same cell performance was exhibited when the fastening pressure was increased to 1200 kgf. Then, in these cells, the voltage durability characteristics were evaluated at a current density of 0.3 A/cm$^2$ required by the rated load. The results are shown in FIG. 10. The characteristics of the fuel cell of Comparative Example are shown together in FIG. 10. As shown in FIG. 10, it is found that the fuel cell of Comparative Example has a degradation of 5 μV/h, whereas the fuel cell of Working Example 1 keeps a degradation of 1 μV/h to work stably. It is considered that in Comparative Example, since the load was increased while the evaluation of the distribution of load was generated, current was concentrated at a place reduced in contact resistance or a local load was applied to MEA, thereby also bringing about a long-term reduction in voltage. It is considered that in Working Example 1, on the contrary, the fuel cell of Working Example 1 keeps a degradation of 1 μV/h so that it works stably and it is therefore possible to prolong the life of the fuel cell. Here, though the effect of the present invention is described by comparing Example 1 with Comparative Example in the descriptions in FIGS. 9 and 10, it is considered that the same or higher effect on the life in Working Example 1 can be obtained in embodiments of Working Examples 2 and 3 which respectively have a higher effect on the uniformity of contact pressure.

The polymer electrolyte fuel cell of the present invention is useful as fuel cells used in, for example, portable power sources, power sources for electric cars and household cogeneration systems.

It is to be noted that, by properly combining the features of the aforementioned various embodiments, the effects possessed by them can be produced.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

The entire disclosure of Japanese Patent Application No. 2007-150309 filed on Jun. 6, 2007, including specification, drawings and claims for patent, are incorporated herein by reference in its entirety.

The invention claimed is:

1. A polymer electrolyte fuel cell comprising:
a fuel cell stack including stacked single cell modules, each of the single cell modules containing a membrane electrode assembly, a pair of separator plates sandwiching the membrane electrode assembly, and a seal member arranged between a periphery of the membrane electrode assembly and the pair of separator plates;
a first end plate disposed on a first end of the stacked single cell modules;
a second end plate disposed on a second end of the stacked single cell modules;
a plurality of fastening members fastening the first end plate and the second end plate together;
a plurality of first elastic members disposed between the first end plate and the plurality of fastening members, respectively, each of the first elastic members being arranged on a surface of the first end plate corresponding to a region where the seal member is arranged in each of the single cell modules; and
a plurality of second elastic members arranged between the first end plate and an end of the fuel cell stack, each of the second elastic members being arranged on a surface of the first end plate corresponding to a region where an electrode portion of the membrane electrode assembly is arranged in each of the single cell modules,
wherein each of the first elastic members and second elastic members is arranged such that the load per unit area which is created by the elasticity of each of the first elastic members is lower than the load per unit area which is created by the elasticity of each of the second elastic members,
wherein the first elastic members are less numerous than the second elastic members,
wherein a recessed portion is formed on an inner surface of the first end plate,
wherein an inside bottom surface of the recessed portion is used as an elastic member arrangement region and the plurality of second elastic members are arranged between the inside bottom surface and the end of the fuel cell stack, and
wherein the first end plate includes a frame portion disposed on a periphery of the recessed portion on the inner surface of the first end plate, and the frame portion is in contact with the end of the fuel cell stack.

2. The polymer electrolyte fuel cell according to claim 1,
wherein each of the separator plates and end plates has a square form,
wherein the plurality of first elastic members includes four first elastic members,
wherein the four first elastic members are arranged on the first end plate at centers of the four sides of the square form, respectively, and
wherein each of the second elastic members is arranged within a square region defined by lines connecting the four first elastic members.

3. The polymer electrolyte fuel cell according to claim 2,
wherein the plurality of second elastic members includes four second elastic members, and
wherein the four second elastic members are respectively disposed on four lines connecting the center of the square region to the four first elastic members, each of the four second elastic members being disposed closer to the center of the square region than the center of the respective line.

4. The polymer electrolyte fuel cell according to claim 1,
wherein each of the separator plates and end plates has a square form,
wherein the plurality of first elastic members includes four first elastic members,
wherein the four first elastic members are arranged on the first end plate at the four corners of the square form, respectively, such that four lines connecting the four first elastic members define a square region,
wherein the plurality of second elastic member includes four second elastic members, and
wherein the four second elastic members are respectively disposed on the four lines defining the square region at locations closer to the center of the square region than the center of the respective line.

5. The polymer electrolyte fuel cell according to claim 1, wherein the fuel cell stack includes a current collecting plate arranged between the second elastic member arrangement region and the stacked single cell modules, and wherein the frame portion is in contact with the current collecting plate.

6. The polymer electrolyte fuel cell according to claim 1, wherein the seal member has a lower rigidity in a stacking direction of the single cell modules than that of the electrode portion of the membrane electrode assembly.

7. The polymer electrolyte fuel cell according to claim 1, wherein each of the fastening members is a fastening bolt which passes through each of the end plates and separator plates, and
wherein each of the first elastic members and each of the second elastic members is a spring member.

8. A polymer electrolyte fuel cell comprising:
a fuel cell stack including stacked single cell modules, each of the single cell modules containing a membrane electrode assembly, a pair of separator plates sandwiching the membrane electrode assembly, and a seal member disposed at a seal arrangement region between a periphery of the membrane electrode assembly and the pair of separator plates;
a first end plate disposed on a first end of the stacked single cell modules;
a second end plate disposed on a second end of the stacked single cell modules, the second end being opposite to the first end;
a plurality of fastening members fastening the first end plate and the second end plate together, each of the fastening members extending through the seal arrangement region of each of the single cell modules;
a plurality of first elastic members disposed between the first end plate and the plurality of fastening members, respectively, each of the first elastic members being arranged on an outer surface of the first end plate corresponding to the seal arrangement region of each of the single cell modules for controlling a load applied to the seal arrangement region; and
a plurality of second elastic members arranged between the first end plate and an end of the fuel cell stack, each of the second elastic members being arranged on an inner surface of the first end plate corresponding to a region where an electrode portion of the membrane electrode assembly is arranged in each of the single cell modules for controlling a load applied to the electrode portion of each membrane electrode assembly,
wherein the first elastic members and the second elastic members are configured such that the load per unit area on the seal arrangement region of each of the single cell modules is lower than the load per unit area on the electrode portion of each of the single cell modules,
wherein a recessed portion is formed on an inner surface of the first end plate,
wherein an inside bottom surface of the recessed portion is used as an elastic member arrangement region and the plurality of second elastic members are arranged between the inside bottom surface and the end of the fuel cell stack, and
wherein the first end plate includes a frame portion disposed on a periphery of the recessed portion on the inner surface of the first end plate, and the frame portion is in contact with the end of the fuel cell stack.

9. The polymer electrolyte fuel cell according to claim 8,
wherein each of the separator plates and end plates has a square form,
wherein the plurality of first elastic members includes four first elastic members,
wherein the four first elastic members are arranged on the first end plate at centers of the four sides of the square form, respectively, and
wherein each of the second elastic members is arranged within a square region defined by lines connecting the four first elastic members.

10. The polymer electrolyte fuel cell according to claim 9, wherein the plurality of second elastic members includes four second elastic members, and
wherein the four second elastic members are respectively disposed on four lines connecting the center of the square region to the four first elastic members, each of the four second elastic members being disposed closer to the center of the square region than the center of the respective line.

11. The polymer electrolyte fuel cell according to claim 8,
wherein each of the separator plates and end plates has a square form,
wherein the plurality of first elastic members includes four first elastic members,
wherein the four first elastic members are arranged on the first end plate at the four corners of the square form, respectively, such that four lines connecting the four first elastic members define a square region,
wherein the plurality of second elastic member includes four second elastic members, and
wherein the four second elastic members are respectively disposed on the four lines defining the square region at locations closer to the center of the square region than the center of the respective line.

12. The polymer electrolyte fuel cell according to claim 8, wherein the fuel cell stack includes a current collecting plate arranged between the second elastic member arrangement region and the stacked single cell modules, and wherein the frame portion is in contact with the current collecting plate.

13. The polymer electrolyte fuel cell according to claim 8, wherein the seal member has a lower rigidity in a stacking direction of the single cell modules than that of the electrode portion of the membrane electrode assembly.

14. The polymer electrolyte fuel cell according to claim 8, wherein each of the fastening members is a fastening bolt which passes through each of the end plates and separator plates, and
wherein each of the first elastic members and each of the second elastic members is a spring member.

15. The polymer electrolyte fuel cell according to claim 8, wherein the first elastic members are less numerous than the second elastic members.

16. A polymer electrolyte fuel cell comprising:
a fuel cell stack including stacked single cell modules, each of the single cell modules containing a membrane electrode assembly, a pair of separator plates sandwiching the membrane electrode assembly, and a seal member arranged between a periphery of the membrane electrode assembly and the pair of separator plates;

a first end plate disposed on a first end of the stacked single cell modules;

a second end plate disposed on a second end of the stacked single cell modules;

a plurality of fastening members fastening the first end plate and the second end plate together;

a plurality of first elastic members disposed between the first end plate and the plurality of fastening members, respectively, each of the first elastic members being arranged on a surface of the first end plate corresponding to a region where the seal member is arranged in each of the single cell modules; and a plurality of second elastic members arranged between the first end plate and an end of the fuel cell stack, each of the second elastic members being arranged on a surface of the first end plate corresponding to a region where an electrode portion of the membrane electrode assembly is arranged in each of the single cell modules, wherein the first elastic members and second elastic members are arranged such that the load per unit area created by the elasticity of the first elastic members on the region where the seal member is arranged is lower than the load per unit area created by the elasticity of the second elastic members on the region where the electrode portion is arranged, wherein a recessed portion is formed on an inner surface of the first end plate, wherein an inside bottom surface of the recessed portion is used as an elastic member arrangement region and the plurality of second elastic members are arranged between the inside bottom surface and the end of the fuel cell stack, and wherein the first end plate includes a frame portion disposed on a periphery of the recessed portion on the inner surface of the first end plate, and the frame portion is in contact with the end of the fuel cell stack.

17. The polymer electrolyte fuel cell according to claim 16, wherein the first elastic members are less numerous than the second elastic members.

* * * * *